United States Patent [19]

Neville

[11] 4,218,087
[45] Aug. 19, 1980

[54] COVERED VEHICLE CONTAINER BODIES

[75] Inventor: George E. Neville, Mansfield, England

[73] Assignee: George Neville Truck Equipment Limited, Nottinghamshire, England

[21] Appl. No.: 904,213

[22] Filed: May 9, 1978

[30] Foreign Application Priority Data

May 11, 1977 [GB] United Kingdom .............. 19682/77

[51] Int. Cl.³ .............................................. B60P 7/04
[52] U.S. Cl. ................................................... 296/100
[58] Field of Search .................... 296/100, 98, 137 B, 296/138; 105/377

[56] References Cited

U.S. PATENT DOCUMENTS

| | | | |
|---|---|---|---|
| 2,877,722 | 3/1959 | Peat | 105/377 |
| 3,762,760 | 10/1973 | Tomson | 296/100 |
| 4,032,186 | 6/1977 | Pickering | 296/100 |
| 4,060,273 | 11/1977 | Neville | 296/100 |
| 4,140,339 | 2/1979 | Fredin | 296/100 |

*Primary Examiner*—Robert R. Song
*Attorney, Agent, or Firm*—Garrettson Ellis

[57] ABSTRACT

A covered vehicle container body defining end walls and a flexible cover as an uncovering device, including a dependent framework supported by the end walls over which the flexible cover extends and is supported. The framework has a lower free end and an upper pivoted portion, pivotally mounted on the end walls, plus operating means for upwardly pivotally moving the framework about the pivot axis of the pivoted portion. Accordingly, the free end effects folding of the flexible cover and uncovering of one side of the body.

10 Claims, 2 Drawing Figures

U.S. Patent  Aug. 19, 1980  4,218,087
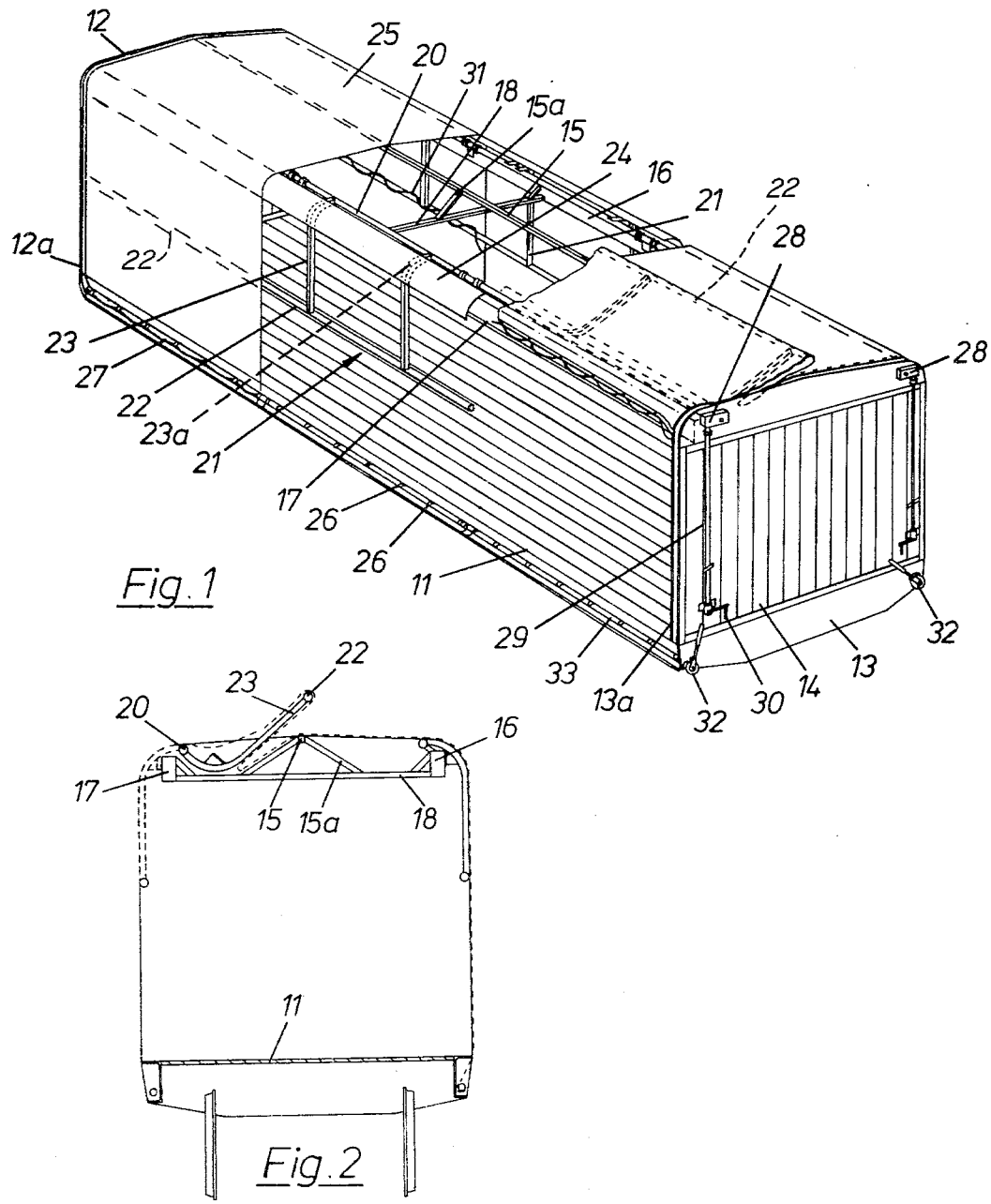

COVERED VEHICLE CONTAINER BODIES

This invention is concerned with covered vehicle container bodies of the type in which the body is at least partially covered by a flexible cover which is foldable to allow access to the body interior.

A covered body of this type is shown in U.S. Pat. No. 3 841 697, which describes a trailer whose body has rigid sides with a flexible cover for the top. A complicated structure is provided to effect folding of the cover to one end of the body. Such a structure would be far too complicated for use on the body of a large goods vehicle and access to the body is difficult. Another construction is shown in U.S. Pat. No. 2 346 554. In this construction, the sides of the body, as well as the top are covered by a flexible cover, which is stretched over a folding framework. A mechanism is used to fold up the framework to open the sides of the vehicle. In this construction, the folding framework is expensive to produce.

The present invention provides a covered vehicle container body having end walls and having at least one side of the body covered by a flexible cover, and an uncovering device including a dependent framework supported by the end walls and over which the flexible cover extends and is supported, the framework having a lower free end and an upper pivoted portion, and operating means for upwardly, pivotally moving the framework about the pivot axis of said pivoted portion, so that the free end effects folding of the flexible cover and uncovering of said one side of the body.

The framework may be further foldable upwardly about a further pivot axis to effect partial opening of the top of the body.

Two opposing covering devices may be provided for opening respective opposite sides of the body.

Preferably, the pivoted portion is mounted on a pivot member to which the operating means is connected to effect rotation of the pivot member.

The free end of the framework is, preferably, attached to the flexible cover.

Reference is now made to the accompanying drawings, wherein:

FIG. 1 is a diagrammatic perspective view of a railway wagon body, shown in closed position at the left hand side, in closed position with the flexible cover removed, in the centre and in open position at the right hand side; and FIG. 2 is a sectional view of the wagon body shown in open position on the left side and closed position on the right side.

Referring to FIGS. 1 and 2, the wagon body shown has a base 11 made up of floor boards and two end frames 12, 13 cladded with boards such as 14. A central beam 15 extends longitudinally between the end frames 12, 13 at apices thereof and two other roof beams 16, 17 also extend between the end frames, parallel to the central beam 15 and spaced on opposite sides thereof. Cross-beams, such as 18, interconnect the roof beams 16, 17 and braces 15a, extend between the central beam 15 and the cross-beams 18.

Adjacent each roof beam 16, 17 and parallel thereto is a respective tubular pivot member 20, extending between the end frames and journalled therein. This member 20 forms part of an uncovering device, which includes a dependent framework 21. The framework includes a tubular member 22, parallel to the pivot member 20, and connecting members 23 between the pivot member 20 and the tubular member 22. Each connecting member has an upper curved position 23a following the contours of the curved edges of the end frames 12 and 13. A curved support plate 24 is secured on the curved portions 23a. Stops (not shown) are provided to limit downward pivotal movement of the framework 21. A flexible cover 25 covers the whole roof area and two opposite sides of the body, the cover being stretched over the two frameworks 21 and secured to the base by means of an elastic rope 27 engaging with hooks 26 on the base.

The cover 25 is secured along the central beam 15 and may be in two parts. Each part may have a beaded edge engaged in a respective complementary socked in a common member extending along the central beam.

A reduction gear box 28 is connected to each respective pivot member 20. An input shaft 29 to each gearbox mounts a handle 30. Turning of the handle effects turning of the respective pivot member 20.

Each tubular member 22, defining the free end of the respective framework 21 is secured to the flexible cover 25 approximately midway down the respective side of the body. Securance is effected by a rope 31.

To open one side of the body, the appropriate handle 30 is turned to effect raising of the framework 21 at that side of the body. Turning is continued until the framework 21 substantially falls back on to the roof. The length of the cover at that side of the body, is thereby folded substantially in half, as shown at the right hand side of FIG. 1. The whole side of the body is uncovered to permit easy access to the interior. The arrangement is such that both sides may be opened simultaneously. The framework provides no lateral projection in the closed position and little upward projection in the open position, so that in either position the whole wagon size is easily arranged to be within the parameters determined by, for example, tunnel clearance.

To effect a weather-tight closure, the end frames 12, 13 are provided with perimetral channels 12a, 13a, and tightening ratchets are provided. To close a side of the body, the appropriate handle 30 is turned to lower the framework 21, permitting the flexible cover to hang over that side. The rope 27 is engaged with the hooks 26 and the appropriate ratchet 32 is used to tighten the cover by turning of a rotatable bar 33 provided with the hooks 26. This tightening causes the side edges of the cover 25 to extend into the channels 12a, 13a forming a seal with the channel lips over which the cover extends.

A similar arrangement to that described above may be used for a road vehicle body.

It is envisaged that each pivot member 20 may be carried on a pivotally movable framework permitting further folding of the flexible cover beyond the central beam 15, so that a part of the roof is uncovered as well as the adjacent side of the body. The whole uncovered area would be completely free of obstruction to permit ready loading by hand or by crane.

What we claim is:

1. A covered vehicle container body having end walls and having at least one side of the body covered by a flexible cover, and an uncovering device including a dependent framework and over which the flexible cover extends and is supported, the framework having a lower, free end and an upper pivoted portion, pivotally mounted on the body, said framework being generally of rectangular form and comprising a bar at the free end of the framework, said upper pivoted portion comprising an elongate member pivotally mounted in stationary manner on said body, and a plurality of struts between said elongate member and the bar and interconnecting said elongate member and bar, wherein said body has a longitudinal roof beam positioned on the longitudinal median plane of said container body, said flexible cover being secured to the beam, and a further of said framework and a further of said covers are provided at the opposite side of said body; and operating means for upwardly pivotally moving the framework about the pivot axis of said pivoted portion, so that the free end effects folding of the flexible container and uncovering said one side of the body.

2. A covered vehicle container body according to claim 1, wherein the free end of the framework extends substantially to the longitudinal median plane of the body, in the uncovered position and extends part way down said side of the body, in the covered position.

3. A covered vehicle container body according to claim 2, wherein the framework is generally of rectangular form comprising a bar at the free end of the framework, an elongate member pivotally mounted on said end walls, and a plurality of struts between said elongate member and the bar and interconnecting said elongate member and bar.

4. A covered vehicle container body according to claim 1, wherein each end of said elongate member is journalled in a respective one of said end walls.

5. A covered vehicle container body having end walls, a longitudinal roof member secured to the end walls, a flexible cover secured to the roof member and covering at least one side of the body, and an uncovering device including a dependent framework extending between the end walls and over which the flexible cover extends and is supported, the framework having a lower free end and an upper pivoted end, means pivotally mounting said upper pivoted end at a fixed location relative to the end walls, said free end extending part way down said side of the body in the covered position and being pivotally moving about said upper pivoted end to extend substantially to the longitundinal median plane of the body in the uncovered position, whereby said free end effects folding of the flexible cover and uncovering of said one side of the body, and operating means for effecting said pivotal movement.

6. A covered vehicle container body according to claim 5, wherein each strut is curved adjacent the elongate member through approximately a right angle, the elongate member and said bar lying in planes differently spaced from said longitudinal median plane.

7. A covered vehicle container body according to claim 5, wherein the body has a longitudinal roof beam on said longitudinal median plane, said flexible cover being secured to the beam, and a further of said frameworks and a further of said covers are provided at the opposite end of the body.

8. A covered vehicle containing body according to claim 7, wherein both of said covers are integral with each other.

9. A covered vehicle container body according to claim 5, wherein the free end of the, or each, framework is fixed to the overlying cover.

10. A covered vehicle container body according to claim 5, wherein the end edge of the, or each, cover remote from the pivotal mounting is adapted for fixing to the body in the covered position.

* * * * *